Aug. 26, 1969   R. C SCHWARTZ   3,462,854
MULTIBASE COUNTER AND CALCULATOR
Filed June 13, 1967   2 Sheets-Sheet 1

Ronald C. Schwartz
INVENTOR.

BY *Clarence A. O'Brien*
*and Harvey B. Jacobson*
Attorneys

Aug. 26, 1969  R. C SCHWARTZ  3,462,854
MULTIBASE COUNTER AND CALCULATOR
Filed June 13, 1967  2 Sheets-Sheet 2
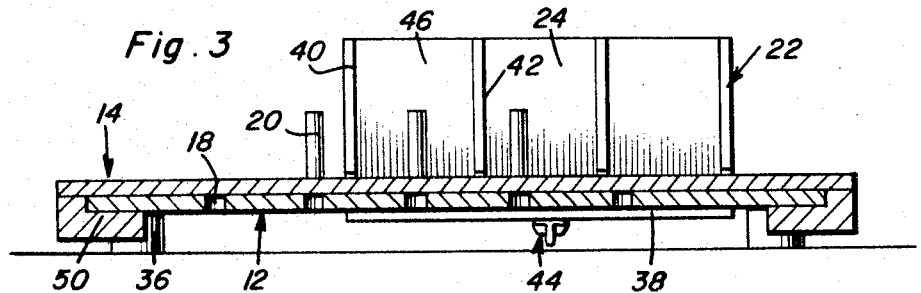
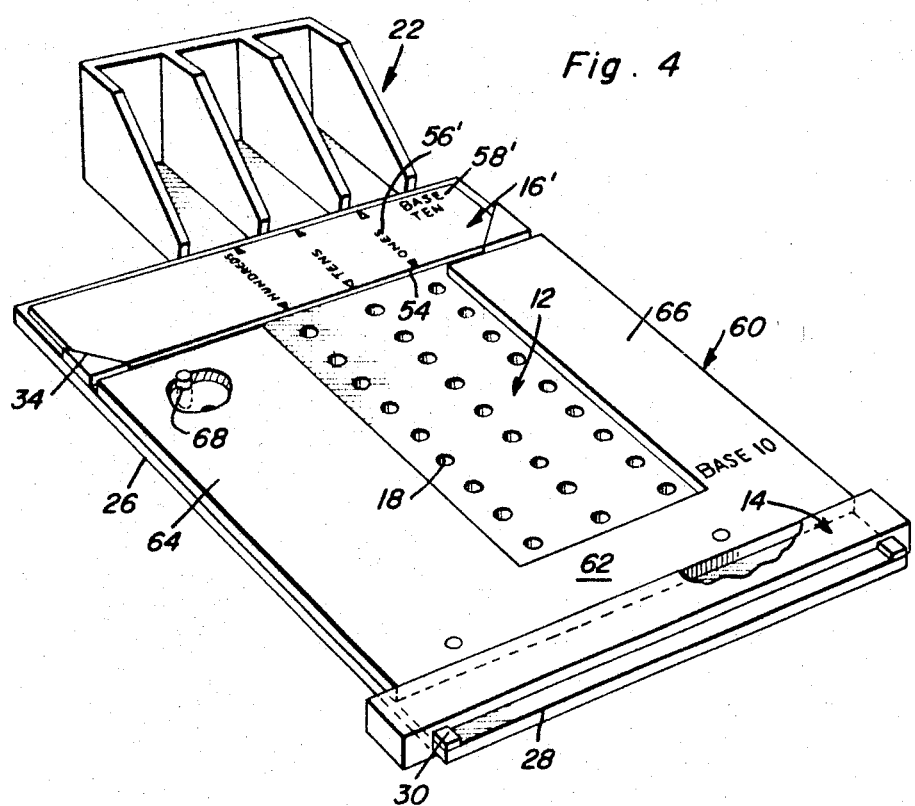
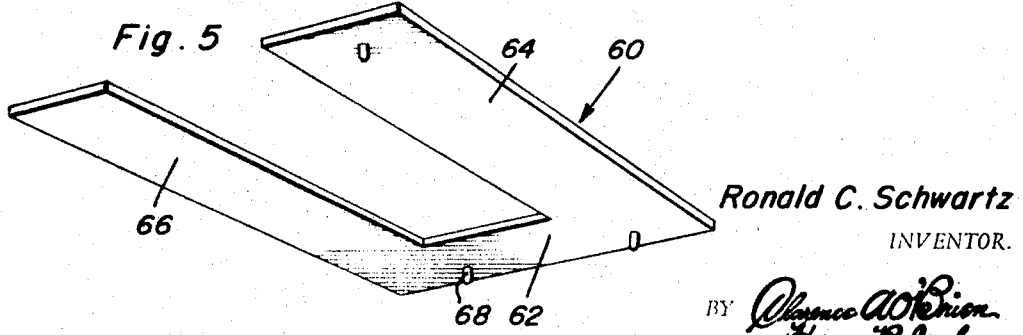
Ronald C. Schwartz
INVENTOR.

United States Patent Office 3,462,854
Patented Aug. 26, 1969

3,462,854
MULTIBASE COUNTER AND CALCULATOR
Ronald C. Schwartz, 60 Penn St.,
East Stroudsburg, Pa. 18301
Filed June 13, 1967, Ser. No. 645,823
Int. Cl. G09b 23/02, 19/02
U.S. Cl. 35—32                    5 Claims

ABSTRACT OF THE DISCLOSURE

An educational training device for teaching arithmetic in different numeral base systems by insertion and withdrawal of pegs on a face board. Peg-receiving holes are arranged in rows on the face board and aligned in columns labelled by a replaceable card positioned on the face board. A slide is moved to a position covering one of the rows to leave a number of rows of holes on one side into which pegs may be inserted, these rows corresponding to the numerals in the base system to which the replaceable card pertains. A plate is provided to cover selected rows and columns between the replaceable card and the slide.

---

This invention relates to an educational aid for assisting students in learning the concepts associated with counting and arithmetical operations in different numeral base systems.

Manipulative devices have been heretofore devised in order to assist students in learning mathematical concepts. In most cases, such educational aids have been limited in use to a single number system or to one particular age or grade level of students. An educational training device which is more versatile would therefore be desirable if it could avoid excessive complexity in arrangement and use. The present invention therefore pertains to such a device capable of training students and helping them lean concepts regarding counting and mathematical operations in any one of a plurality of different numeral base systems. Further, the device of the present invention may be conditioned for the learning of relatively simple concepts by younger children without confusion as well as to teach more advanced students the more sophisticated concepts.

In accordance with the present invention, the educational training device of the present invention features a manipulative face board provided with a plurality of peg-receiving holes arranged in rows and columns, each being adapted to be labelled as a place in a numeral system while each row is labelled by a base numeral. Thus, pegs are inserted into the holes for counting in a selected base system to which the device is conditioned by means of a sliding bar covering one of the rows so as to confine use of the face board to a peg-receiving area on one side thereof in accordance with the limits of the selected numeral base system.

In accordance with the position to which the sliding bar is moved, replaceable place cards of the same dimensions are positioned on the face board in order to label or identify the place columns formed by the peg-receiving holes on the face board. The place cards may be designed for assisting either beginning students or more advanced students. A hole covering plate or block board may also be provided in order to limit use of the face board to a predetermined area in lieu of the sliding bar aforementioned so as to condition the device for very young students by blocking holes and indicia that may render the device confusing to such beginners.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a transverse sectional view through the device taken substantially through a plane indicated by section line 3—3 in FIGURE 1.

FIGURE 4 is a perspective view of the device conditioned for use by young beginning students.

FIGURE 5 is a perspective view of the block board component associated with the device when conditioned as illustrated in FIGURE 4.

Figure 1:
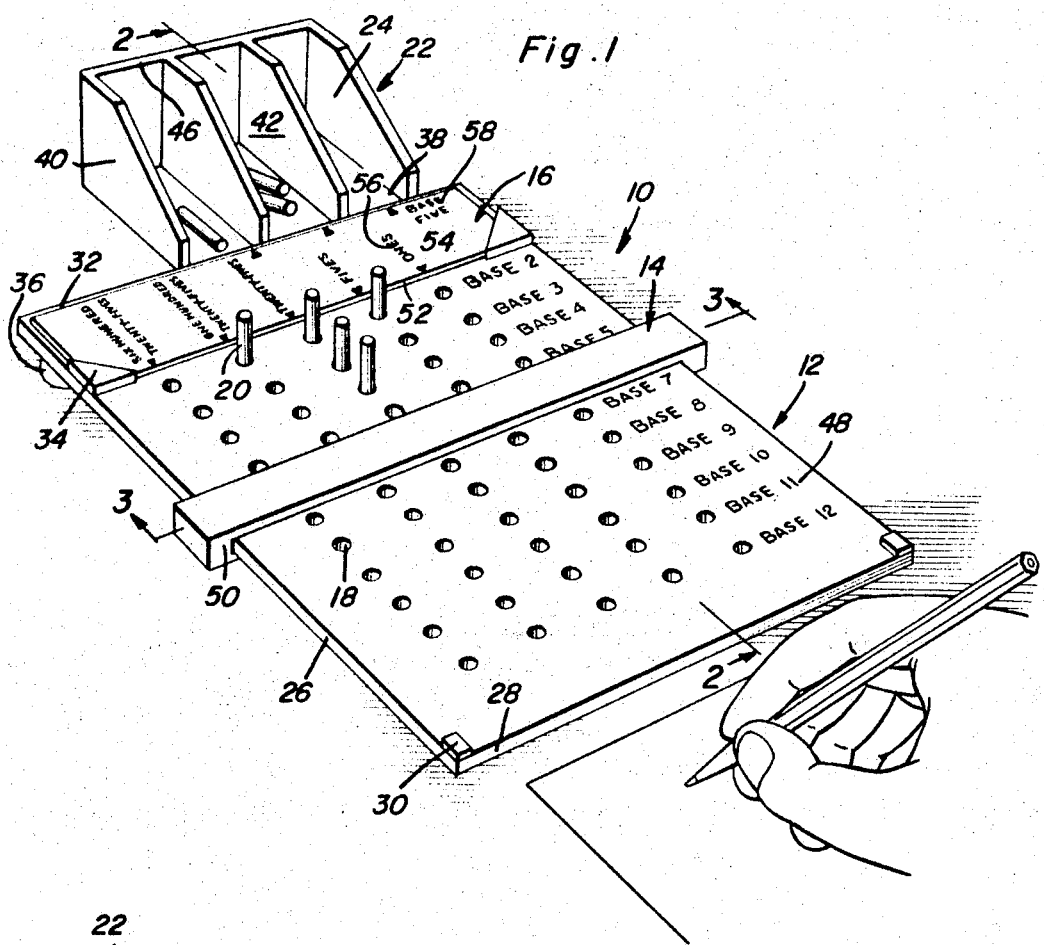
FIGURE 1 is a perspective view showing the device of the present invention in use.

Referring now to the drawings in detail, it will be observed from FIGURE 1 that the counter and calculator device of the present invention generally referred to by reference numeral 10 comprises essentially a face board generally denoted by reference numeral 12, a base system selecting slide bar 14, a replaceable place card 16 positioned on the base board so as to label a plurality of columns formed by peg-receiving holes 18 on the face board, the holes being also transversely aligned in rows one of which is adapted to be covered by the slide bar 14, and a plurality of pegs or counting elements 20 adapted to be inserted and removed from the holes 18 by the student. A peg receptacle 22 may also be associated with the device 10 partitioned into a plurality of peg storing bins 24, the bins being aligned with the columns of holes.

The face board 12 may be of a suitable shape such as a rectangle as shown and made of a suitable rigid material in order to support the other components of the device. The holes 18 are arranged in columns as aforementioned equally spaced from each other and parallel to the side edges 26 of the face board to correspondingly position pegs seated therein. On the right side of the right hand column of holes, each row of holes is labelled as base $n$, where $n$ equals 2 through 12. The rows are spaced apart a sufficient distance so that the slide bar 14 may be moved to a position covering one row of holes at a time. The bottom row of holes is also spaced a sufficient distance from the lower edge 28 of the face board so that the slide bar 14 when resting against the stops 30 will avoid covering any of the rows of holes. The stops 30 prevent disassembly of the slide bar from the face board. The uppermost row of holes is spaced a sufficient distance from the upper edge 32 so as to accommodate positioning of the place card 16 thereon. Corner supports 34 are secured or cemented to the top of the face board in spaced relation to the top edge 32 in order to receive the corners of the replaceable place card and to limit movement of the slide bar 14. Supporting legs 36 may also be secured to the underside of the face board adjacent the upper edge thereof.

Figure 2:
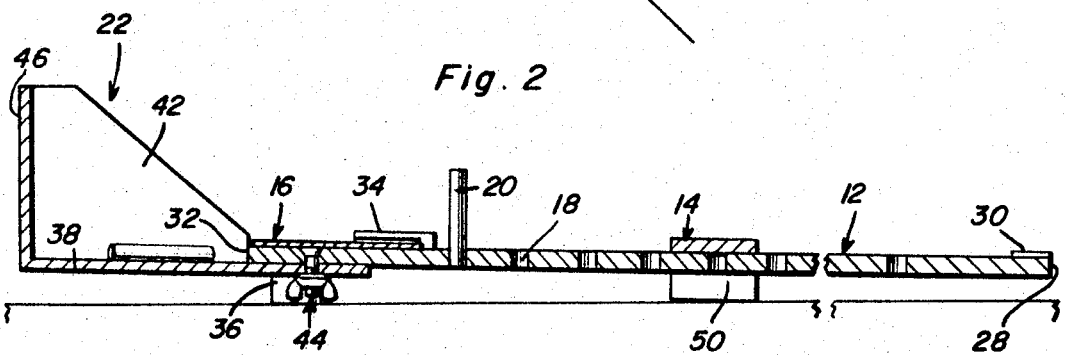
FIGURE 2 is a longitudinal sectional view through the device taken substantially through a plane indicated by section line 2—2 in FIGURE 1.

The peg receptacle includes a bottom plate 38 to which the side walls 40 and partitions 42 are secured in parallel spaced relation to each other extending upwardly in abutting relation to the top edge 32 of the face plate. The bottom wall 38 extends underneath the face board and is secured thereto by a wing nut fastener assembly 44 as more clearly seen in FIGURE 2. A back wall 46 is secured to the bottom wall and extends transversely between the side walls 40 interconnecting the side walls with the partitions 42 to complete the receptacle.

As hereinbefore indicated, the slide bar 14 extends transversely across the face board and is of a width less than the spacing between two rows of holes but sufficient to cover one row of holes as illustrated as well as to block the base number indicia 48 which labels each row. The sides 26 of the face board are accordingly embraced by the end portions 50 of the slide bar so as to constrain movement of the slide bar in a direction parallel to the columns of holes.

A variety of different place cards may be prepared for use in connection with the device such as the place card 16 illustrated in FIGURE 1. As shown, the place card is provided adjacent one longitudinal edge 52 thereof with a plurality of indicators 54 adapted to be aligned with the columns of holes formed on the face board when the place card is positioned on the face board by means of the corner supports 34 adjacent the top edge 32. Each indicator 54 is labelled by a place number 56 identifying the column of holes in accordance with the base numeral system to which the place card pertains as indicated by the card title 58. To use the place card 16, the slide bar 14 is accordingly positioned so as to cover the row of holes just below the row labelled by the base number corresponding to the title of the place card in position to accordingly limit use of the face board to one side of the slide bar.

In order to condition the device for use by beginning students, learning to count and perform arithmetical operations in the most common base 10 numeration system, a block board or hole covering plate 60 is utilized as shown in FIGURES 4 and 5. The slide bar 14 is displaced to an inactive position abutting the stops 30 when the block board 60 is placed on the face board so that the lower bridging portion 62 may block the two lowermost rows of holes while a wider side portion 64 blocks the two left hand columns of holes and the narrower side portion 66 blocks the indicia 48 labelling the rows. A plurality of mounting pegs 68 project from the block board and are received in selected holes on the face board for properly positioning the block board on the face board to limit use of the device to three columns of holes associated with the base 10 numeral system. Also, by covering the right hand labels 48, the device will appear more simple and less confusing to the young student. A place card 16' also utilized with the device as shown in FIGURE 4 will be limited to a smaller number of indicators 54' and associated numeral place indicia 56' such as ones, tens and hundreds. The card 16' will also be appropriately labelled as base 10 by the title 58'.

Figure 6:
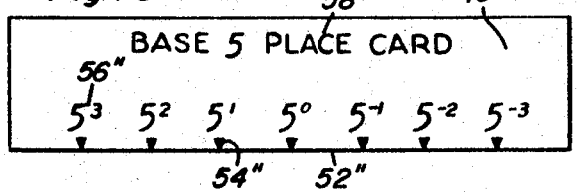
FIGURE 6 is a top plan view of a typical place card associated with the device when conditioned for use by more advanced students.

A more sophisticated place card 16" could be utilized as illustrated in FIGURE 6 corresponding for example to the base 5 as indicated by the title 58". The indicators 54" disposed along the column identifying edge 52" may be labelled by place numbers 56" as $n^{\pm x}$, where $n$ equals the base number and $x$ is the exponent from 0 to $\pm 3$ as shown in FIGURE 6 corresponding to a face board provided with seven columns of peg-receiving holes. Operations with fraction and decimals may then be handled in view of the use of negative exponents. It will also be appreciated that the device may vary in size and extent to which it is usable by varying the number of columns as well as the number of rows depending upon the number of base systems which are to be handled.

The construction of the device is apparent from the foregoing description as well as the manner in which it is conditioned for use in training students with regard to a selected numeral base system. For example, a student may be trained to count in the base 5 numeral system by positioning an appropriate place card 16 on the face board as shown in FIGURE 1 and positioning the slide bar to the illustrated position exposing the rows of holes labelled base 2 through base 5 so that each column of holes on the upper side of the slide bar will contain four holes. A student is trained to count in the base 5 numeral system by inserting pegs into the right hand ones column as illustrated in FIGURE 1 beginning with the uppermost peg-receiving hole until four pegs have been inserted. To continue the count, the four pegs are removed and a fifth peg inserted in the uppermost hole of the fives column. Four more pegs may then be counted by inserting them into the holes of the ones column and then removed when a tenth peg is inserted to form the second peg in the fives column. Thus, the count proceeds until four pegs complete the fives column after which they are replaced by a peg inserted into the twenty-fives column and so on. In the example illustrated in FIGURE 1, the number represented by the pegs on the face board may be written down as 1310 base 5 which corresponds to 205 in our common base 10 numeral system.

Addition and subtraction in the selected base system may be performed by merely adding pegs or withdrawing pegs from the face board in accordance with the counting system associated with the selected base system. Similarly, multiplication may be performed by adding a quantity a predetermined number of times corresponding to the multiplier. By withdrawing or subtracting a predetermined number of pegs constituting the divider from a number or dividend established on the face board until no pegs remain, the number of withdrawals counted will be the quotient in a division operation.

Arithmetical operations may of course be performed with fractions or decimals by appropriately labelling the columns of holes as indicated on the right side of the place card 16" illustrated in FIGURE 6. Although the device 10 may be so utilized for advanced students, by limiting use of the device by means of a block board 60 as shown in FIGURE 4, the device will also be suitable for beginning students as aforementioned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An educational training device for counting and performing mathematical operations comprising, a face board having a plurality of positioning seats arranged in place columns and transverse rows, a plurality of counting elements adapted to be positioned in said seats, a plurality of indicia bearing cards of fixed dimension, said face board having labeling portions identifying the rows of seats in terms of a plurality of base systems, holding means fixedly mounted on the face board for positioning one of the cards transversely of the columns to identify each of the columns in terms of a selected one of the base systems and blocking means for covering selected portions of the face board including labeling portions to limit use of the device to one of the base systems, the blocking means including a plate, and registry means for positioning the plate on the face board covering selected ones of said place columns and transverse rows.

2. The combination of claim 1 wherein said positioning seats on the face board are peg-receiving holes and said registry means includes pins projecting from the plate received in selected ones of said holes.

3. An educational training device for counting and performing mathematical operations comprising, a face board having a plurality of positioning seats arranged in place columns and transverse rows, a plurality of counting elements adapted to be positioned in said seats, a plurality of indicia bearing cards of fixed dimension, said face board having labeling portions identifying the rows of seats in terms of a plurality of base systems, holding means fixedly mounted on the face board for positioning one of the cards transversely of the columns to identify each of the columns in terms of a selected one of the base systems and blocking means for covering selected portions of the face board including labeling portions to limit use of the device to one of the base systems, said blocking means including an elongated bar extending transversely across the face board of a width covering one of the rows of said seats and labeling thereof, means slidably mounting the elongated bar on the face board for movement between limit positions parallel to the columns, a plate, and registry means for positioning the plate on the face board covering selected ones of said place columns and transverse rows between the holding means and the elongated bar in one of the limit positions.

4. The combination of claim 3 wherein said positioning seats on the face board are peg-receiving holes and said registry means includes pins projecting from the plate received in selected ones of said holes.

5. The combination of claim 4 including receptacle means secured to the face board having a plurality of peg storing bins spaced from said columns of holes by said one of the cards.

References Cited
UNITED STATES PATENTS

| | | | |
|---|---|---|---|
| 264,572 | 9/1882 | Schwenniger | 35—32 |
| 2,530,447 | 11/1950 | Birdsall | 35—33 |
| 2,646,631 | 7/1953 | Lazar | 35—33 |
| 3,138,879 | 6/1964 | Flewelling | 35—32 |

FOREIGN PATENTS

| | | |
|---|---|---|
| 587,220 | 4/1947 | Great Britain. |

EUGENE R. CAPOZIO, Primary Examiner

W. H. GRIEB, Assistant Examiner